United States Patent Office 3,026,290
Patented Mar. 20, 1962

3,026,290
PROCESS OF POLYMERIZING A VINYL ETHER WITH A TRIALKYL - ALUMINUM TITANIUM TETRACHLORIDE CATALYST
Earl W. Gluesenkamp, Dayton, Ohio, assignor to Monsanto Chemical Company, St. Louis, Mo., a corporation of Delaware
No Drawing. Filed May 11, 1955, Ser. No. 507,717
3 Claims. (Cl. 260—45.5)

This invention relates to the polymerization of vinyl ethers. In some aspects the invention pertains to the copolymerization of vinyl ethers with ethylene and other unsaturated hydrocarbons. In other aspects the invention provides new ethylene polymers modified in properties by the incorporation therein, by copolymerization, of minor amounts of vinyl ethers. Yet other aspects of the invention provide polymers useful as adhesives, surface coatings, films, laminates, plasticizers, tackifiers, impregnants for paper, textiles, leather, and the like. Still other aspects of the invention provide improvements in the polymerization and copolymerization of vinyl ethers with catalysts exemplified by the material obtanied by the interaction of a trialkylaluminum with titanium tetrachloride.

Vinyl ethers are relatively inexpensive monomers, being easily made from acetylene and alcohols. Polymers can be obtained from vinyl ethers, having a wide variety of characteristics depending upon the particular vinyl ether monomer employed, the comonomers if any employed, and the conditions of polymerization. The present invention provides a new method for the polymerization and copolymerization of vinyl ethers, making possible the production of vinyl ether polymers and copolymers finding many uses in the industrial arts.

One class of products of the present invention of particular interest is prepared by the copolymerization of vinyl ethers with ethylene, using proportions of monomers and conditions such that the polymer contains a major weight proportion of ethylene and a minor proportion of vinyl ether. Such a product can be made having the general physical characteristics of polyethylene, the presence of the vinyl ether modifying these characteristics to make the polymer somewhat softer and adhesive. This copolymer finds special use in the interlayer of laminated safety glass, and as a readily printable film.

The invention is carried out by polymerizing one or more vinyl ethers, or by copolymerizing one or more vinyl ethers with one or more polymerizable ethylenically unsaturated hydrocarbon comonomers, in the presence of a catalyst prepared by the interaction of (a) an aluminum compound of the general formula $R_2AlX$ wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The practice of the various aspects of the invention will be described by way of example, with particular reference to catalysts prepared by the interaction of trialkylaluminums, e.g., triethylaluminum, triisobutylaluminum, trioctylaluminum, with titanium tetrachloride. particular reference will also be made to the use of vinyl alkyl ethers, and to the use of ethylene as a comonomer, but it is to be understood that other vinyl ethers, and other ethylenically unsaturated hydrocarbon comonomers, can likewise be employed in any proportion in order to obtain the desired physical characteristics.

It is a significant advance to discover that catalysts of the type described are effective in polymerizing vinyl ethers, inasmuch as these catalyst compositions are quite sensitive to acetylene, oxygen, water, carbon oxides, and many organic compounds containing oxygen such as alcohols, ketones, and the like, such oxygen or oxygen-containing materials destroying the activity of the catalyst towards the polymerization of ethylene and other monomers including the vinyl ethers.

The present invention applies generally to all polymerizable vinyl ethers. Of particular interest are the vinyl alkyl ethers, e.g., vinyl methyl ether, vinyl ethyl ether, vinyl n-propyl ether, vinyl isopropyl ether, vinyl n-butyl ether, vinyl isobutyl ether, vinyl sec.-butyl ether, vinyl tert.-butyl ether, the various isomeric amyl, hexyl, heptyl, octyl, dodecyl, undecyl, hexadecyl, etc., vinyl ethers. However, the invention is also applicable to cycloalkyl ethers, aryl ethers, alkaryl ethers, aralkyl ethers, cycloalkyl alkyl ethers, alkyl cycloalkyl ethers. By way of further example, but not limitation, there may be mentioned cyclohexyl vinyl ether, methylcyclopentyl vinyl ether, cyclopentylethyl vinyl ether, phenyl vinyl ether, tolyl vinyl ether, benzyl vinyl ether, cyclohexylbenzyl vinyl ether, phenylcyclohexyl vinyl ether, p-isopropylphenyl vinyl ether. The vinyl ethers can be polymerized alone, i.e., homopolymerization, or can be subjected to interpolymerization with polymerizable ethylenically unsaturated monomers. Of particular interest as comonomers, are the mono-ethylenically unsaturated hydrocarbons containing a vinyl, i.e., $CH_2=CH—$, group. By way of example, but not limitation, of suitable comonomers there can be mentioned ethylene, proplyene, butene-1, butene-2, isobutylene, the various isomeric amylenes, hexenes, heptenes, octenes, and higher aliphatic olefins, either straight chain or branched and preferably but not necessarily terminally unsaturated, i.e., 1-olefins, styrene, α-methylstyrene, cyclohexene, butadiene-1,3, vinylcyclohexene, vinylcyclohexane, vinyltoluene, isoprene, cyclopentadiene, vinylnaphthalene, vinylisopropylbenzene. However, of these the vinyl hydrocarbons are much preferred because they are far more active in entering into copolymerization reaction with the vinyl ethers. Also within the scope of thei nvention is the copolymerization of two or more vinyl ethers with each other, which is considered to come within the terminology "polymerization of a vinyl ether." It may also be mentioned that two or more vinyl ethers can be copolymerized with one or a plurality of unsaturated hydrocarbon monomers of the type described. All of these homopolymerizations and copolymerizations are generically referred to as "polymerization of a vinyl ether." Another type of copolymerization of special value can be called "block" polymerization wherein one of the monomers is first polymerized alone, followed by polymerization of the second monomer in the presence of the preformed polymer of the first monomer. Thus, ethylene can be first polymerized in the presence of a catalyst of the type described herein, then the ethylene flow stopped and the vinyl ether introduced and polymerized in the presence of the preformed ethylene polymer. This produces a polymer having the characteristic "backbone" of polyethylene but modified by the addition of polyvinyl ether chains to the polyethylene structure, permitting retention of most of the thermal and mechanical properties of polyethylene with the addition of certain properties of polyvinyl ethers. Thus, by such a block copolymer one can obtain film of increased printability and adhesiveness over that of polyethylene alone. A different type of block polymer can be prepared by first polymerizing the vinyl ether followed by polymerization of ethylene in the presence of the preformed polyvinyl ether. Alternatively, one of the monomers can first be polymerized followed by polymerization of a mixture of that monomer with the other monomer. These and other variants that will be apparent to those skilled in the art, having been given the benefit of the present disclosure, are to be considered to be within the scope of the terms "polymerization," "polymer," "copolymerization" and "copolymer" as used herein.

Preferred vinyl ethers contain not over 20 carbon atoms per molecule. Likewise, preferred unsaturated hydrocarbon comonomers contain not over 20 carbon atoms. The lower vinyl ethers and the lower unsaturated hydrocarbons, e.g., those containing not over 10 carbon atoms per molecule, are most often used to advantage.

The invention is broadly applicable to the copolymerization of a vinyl ether (one or more) with an unsaturated hydrocarbon (one or more) in all proportions ranging from the smallest proportion of vinyl ether that will significantly affect the properties of a predominantly unsaturated-hydrocarbon-polymer containing same to the smallest proportion of an unsaturated hydrocarbon that will significantly affect the properties of a predominantly-vinyl-ether-polymer containing the same. Of particular value are those copolymers of unsaturated hydrocarbons with vinyl ethers wherein the latter are present in only a minor proportion, and preferably in an amount not exceeding 35 weight percent of the combined vinyl ether and unsaturated hydrocarbon in the molecule. Such copolymers take on the general characteristics of the polymers of the unsaturated hydrocarbon chosen, but are softer due to the inclusion of the vinyl ether and have enhanced adhesion to other materials. Thus, such copolymers as those containing a major proportion by weight of ethylene and a minor proportion by weight of methyl vinyl ether, or such as those containing a major proportion by weight of butene-1 and a minor proportion by weight of ethyl vinyl ether, by way of example, are useful in the interlayer of laminated safety glass. Another class of copolymers of particular value is that containing a major proportion by weight of a vinyl ether and a minor proportion by weight, preferably not exceeding 35 weight percent, of an unsaturated hydrocarbon comonomer. These materials take on the general properties of polymers of the particular vinyl ether employed, but have enhanced body and cohesiveness, and in many instances are easier to handle, and thus have advantages in use of the copolymers as adhesives, as water dispersable polymers for use in emulsion-type adhesives, surface coatings, and the like, as impregnants for leather, textiles and paper, as plasticizers for other polymers, as tackifiers in rubber compositions and adhesive compositions, as wax additives, and many other applications. In discussing proportions of vinyl ethers to unsaturated hydrocarbon comonomers in the present application, I have reference to the proportions found in the finished polymer unless otherwise specifically indicated. The following polymer compositions are mentioned by way of example of desirable products, the percentages being the weight percentage of the named monomer present in combined form in the polymer.

Ethyl vinyl ether 80, ethylene 20
2-ethylhexyl vinyl ether 80, ethylene 20
Phenyl vinyl ether 10, ethylene 90
Methyl vinyl ether 30, ethylene 70
Methyl vinyl ether 30, ethylene 60, propylene 10
Methyl vinyl ether 10, isobutyl vinyl ether 25, octene-1 65
n-Butyl vinyl ether 50, styrene 50
Isopropyl vinyl ether 20, butadiene 80
2-ethylhexyl vinyl ether 10, isoprene 15, butadiene 75
Ethyl vinyl ether 85, butadiene 15

While the polymerization of this invention can be carried out with a variety of combinations of variables, it is usually preferred to carry out the polymerization at a temperature below about 35° C., and/or by the use of trialkylaluminums containing long alkly groups, e.g., those averaging at least 8 carbon atoms per alkyl group. These preferred procedures are desirable for the purpose of increasing the yield of the polymer.

Suitable aluminum compounds to be reacted with the chlorides, bromides or iodides of titanum or zirconium are those represented by the general formula $R_2AlX$ wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecyloctylaluminum
Diisobutylaluminum hydride
Tridodecylaluminum
Diphenylaluminum bromide
Dipropylcyclohexylaluminum
Ditolylmethylaluminum
Tri-($\beta$-phenylethyl)aluminum
Diethylaluminum chloride
Diisobutylaluminum chloride
Diisobutylaluminum iodide
Di($\beta$-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as $R_2AlCl$ plus $RAlCl_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The tetrahalides are especially preferred, although the dihalides, trihalides, mixtures of di-, tri- and tetrahalides, etc., can be used. Preferred titanium or zirconium compounds are those that are soluble in an organic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, $K_2TiF_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.3:1 to 10:1 on up to 15:1 or higher. It is generally preferred to use an Al:Ti mol ratio between 2.0:1 and 5:1. The same ratios apply in the case of the zirconium compounds. While active catalysts can be prepared by a variety of procedures, the simplest and perhaps most effective is to add the titanium or zirconium halide to the aluminum compound, preferably in the presence of an inert organic solvent. Such solvents can suitably be saturated aliphatic and alicyclic, and aromatic, hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosenes, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane.

It may also be mentioned here that the polymerization can readily be effected in the presence of any of the classes of solvents and specific solvents just named. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between monomers and catalyst and in aiding removal of heat of reaction, to employ larger amounts of solvent, for example from 5 to 30 parts by weight solvent per 1 part by weight total polymer produced.

The amount of catalyst required is dependent on the other variables of the polymerization reaction, and although amounts as small as 0.01 weight percent based on total weight of monomers charged are sometimes permissible, it is usually desirable to use larger amounts, such as from 2 to 5 percent or even considerably higher. When polymerization is effected in the presence of a solvent, the catalyst to solvent weight ratio should be at least about 0.003:1.

The polymerization can be effected over a wide range of temperatures, such as from room temperatures down to say minus 40° C. and even lower. It is usually preferred that the temperature be maintained at about 30° C. or below. A temperature ranging up to 100° C. and higher is satisfactory. It is seldom advantageous, however, to exceed 50 or 60° C., and room temperature is quite satisfactory.

The polymerization reaction is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have a desirable effect on reaction rate and in some instances on polymer quality. The choice of whether or not to use an appreciably elevated pressure will be one of economic and practical considerations taking into account the advantages that can be obtained thereby.

The vinyl ether, with or without comonomers, is contacted with the catalyst in any convenient manner, preferably merely by bringing the catalyst and monomers together with intimate agitation provided by suitable stirring or other means. The agitation can be continued during the polymerization, or the polymerization mixture can be allowed to remain quiescent while the polymerization takes place. In the case of the more rapid reactions with the more active catalysts, means can be provided for refluxing monomer and solvent, if any of the latter is present, and thus removing the heat of reaction. If desired, the vinyl ether, with or without comonomer, can be brought in the vapor phase into contact with the solid catalyst, in the presence or absence of liquid solvent. The monomer or mixture of monomers can be introduced to the reaction mixture either in the total quantity to be used during the polymerization, or gradually by intermittent or continuous addition to the reaction mixture. Where the reaction is carried out at or near atmospheric pressure, it is convenient, in the case of a gaseous comonomer such as ethylene, propylene, etc., to bubble same into the reaction mixture at a rate not greatly in excess of the maximum rate at which it is taken up by polymerization. The vinyl ether can be introduced during the entire period of introduction of the comonomer, or the total quantity of vinyl ether to be used can be first introduced, or various other procedures can be followed in accordance with the desired type of copolymer or block copolymer. A gaseous monomer can have admixed therewith a vinyl ether to be copolymerized, the partial pressure of the vinyl ether being such as to give the desired proportion of the comonomers, and the mixed monomers brought in vapor phase into contact with the catalyst. The vinyl ether can be introduced as a liquid, either the total amount to be used at one time or gradually, or as a gas when admixed with sufficient ethylene or other gaseous monomer, or inert gas, or in any event as a gas if the temperature is sufficiently high to effect substantial vaporization of the vinyl ether at the given pressure. The reaction can be carried out batchwise by providing a reaction vessel such as a mechanically stirred or shaken pressure bomb, into which is introduced the catalyst, any solvent to be used, the total vinyl ether monomer, and the total unsaturated hydrocarbon comonomer if any is to be used in the reaction. Preferably, however, especially in order to provide controlled reaction rate and to avoid too great an extent of reaction during a limited period of time which would cause undesirably high and possible dangerous rise in temperature and pressure, at least the more reactive monomer, usually the vinyl ether, is added to such a bomb intermittently or continuously at a rate adapted to maintain an essentially constant pressure, which may be about atmospheric, or sub-atmospheric, or often superatmospheric within the ranges described herein. In such types of reaction, any comonomer can also be added gradually either continuously or intermittently, or can be charged in toto at the beginning of the reaction. In the case of ethylene it is convenient to charge ethylene gradually because of its rapid rate of polymerization. The polymerizations and interpolymerizations of this invention are also readily adapted to continuous flow processes. For example, all monomers plus catalyst plus any solvent, can be admixed and passed continuously through an elongated reaction tube of comparatively small diameter, which is contacted externally with suitable cooling medium to maintain desirable reaction temperature. The vinyl ether, and/or the unsaturated hydrocarbon comonomer, if any, and/or the catalyst can be added multipointwise along the length of the reaction tube if desired. These and numerous other variations in carrying out the polymerization will be well understood by those skilled in the polymerization art.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The vinyl ether, and the unsaturated hydrocarbon comonomer, if any, need not be pure so long as they are reasonably free from poisons. It is desirable, however, that the vinyl ether be separated from the bulk of other materials by suitable procedures, usually distillation, so as to provide a vinyl ether content in the vinyl ether feed of at least 90 percent and preferably higher. In the case of ethylene as a comonomer, a mixture of ethylene with ethane, with or without propane and with or without some propylene, can be used and such mixtures are readily obtainable from refinery gases and from ethylene manufacturing processes thereby avoiding the treatment of same to provide the ethylene in highly concentrated form. However, ethylene content of the ethylene-containing feed should preferably be at least 75 weight percent and preferably above 90 weight percent. Similar considerations apply to other unsaturated hydrocarbon feeds. Thus, a mixture of butadiene with butanes, with or without some butenes, can be used, and such mixtures are readily obtainable from refinery gases and from butadiene manufacturing processes such as those involving dehydrogenation of butanes and butenes. Likewise, styrene can be used in the grade sold commercially as "monomer grade," which is quite pure, and can also be used in admixture with ethylbenzene from which styrene is prepared by dehydrogenation, thus making unnecessary or minimizing the extent of a separation of styrene from ethylbenzene. As has also been mentioned above, a variety of solvents can be present during the reaction.

The recovery of polymer from the reaction mixture will be dependent to a considerable extent upon the solubility of the polymer in any solvent that may have been present during the polymerization. Homopolymers of the lower alkyl vinyl ethers, for example, are quite soluble in almost all organic solvents such as aromatic hydrocarbons, aliphatic hydrocarbons, e.g., hexane, alcohols, e.g., methanol, ketones, e.g., methyl vinyl ketone, acetone; such polymers can be separated from the solvent present in the reaction mixture by heating so that the solvent evaporates. If desired to remove catalyst residues, this can be accomplished by contacting with aqueous acids, preferably admixed with methanol. Homopolymers of the higher alkyl vinyl ethers, are insoluble in solvents such as acetone and therefore can be treated with acetone containing aqueous HCl, with isobutanol, etc. to remove catalyst residues. Most of the copolymers of the invention can be separated from any solvent used in the polymerization by filtering, centrifuging or otherwise removing the solid polymer from the liquid material. The solid polymer is then desirably washed with a reactive organic solvent or an acid followed by base then water for removal of catalyst residues which impart color to the polymer. It is often desirable to include a treatment with hydrochloric acid dissolved in a siutable organic solvent, e.g., methanol, and preferably with a small amount of water present, in order to obtain maximum removal of catalyst residues. The polymer can also be washed with isobutanol to effect considerable removal of catalytic materials. Many other procedures and materials can be used to work up the products and all such can be employed without departing from the invention. When the polymer is to be used in a finished composition or article in which a light color is not essential, a simple separation of polymer followed by a single washing with organic solvent, or even mere evaporation of any organic solvent used during the polymerization, may often be sufficient, as catalyst residues that may remain in the polymer after such treatment will not be objectionable because of their color.

The following specific examples are given by way of illustration of different catalyst combinations, conditions for catalyst preparation, monomers and proportions thereof, polymerization conditions, and methods of working up the products. It will be understood, however, that variations from the exact details given can be made without departing from the invention.

The catalyst preparations and polymerizations of the following examples were effected in a reactor which was a vertically elongated glass tube with a curved bottom. It was stirred by means of a short bar of iron sealed in a glass envelope and free to move in the bottom of the reactor and a magnetic stirring device provided immediately under the reactor which caused the stirring bar to undergo rapid rotation in the reaction mixture. Means were provided for flushing the reactor with nitrogen gas prior to introduction of reagents and during the polymerizations when desired. Materials were introduced into the reactor from a dropping funnel attached thereto. Most reactions were started at room temperature and run at the temperature attained by virtue of the liberated heat of polymerization, seldom over 30 to 35° C. In some cases the reactor was heated by an electrical resistance mantle around it. When ethylene gas was added, this was first through a bubbler to determine the approximate rate of addition and then through a sparging tube which dipped into the liquid reaction mixture. In some instances, a cold-finger condenser was inserted in the reactor to reflux vaporized vinyl ether monomer.

*Example 1*

Into the reactor was placed 0.42 gram of titanium tetrachloride ($TiCl_4$) in 20 cc. reagent grade (thiophene-free) benzene. While the material was stirred, there was added under the protection of lamp grade nitrogen, from 0.5 to 0.6 gram triethylaluminum (TEA) in 5 cc. hexane, resulting in the formation of a blackish slurry. The mol ratio of aluminum to titanium was about 2:1. After three minutes stirring, ethyl vinyl ether was added dropwise. Immediate heat evolution was apparent. A slow portion-wise addition of the ether was necessary to avoid its loss by vaporization. A blackish slurry of solids was observed to form. A cold finger was installed in the system to reflux the ethyl vinyl ether vaporized by the heat of reaction. 35 cc. of the ether was added over a period of about one hour.

The final reaction mixture was a smooth, brown-black viscous syrup. This syrup was completely miscible with methanol, ethanol, isopropanol, isobutanol, hexane and acetone. A portion of the syrup was heated with methanol at 90° C. until no more solvent vaporized. The thus-recovered polyvinyl ethyl ether was a sticky, resinous mass, and was an excellent adhesive.

*Example 2*

In the manner of Example 1, catalyst was prepared by adding 1.0 gram triethylaluminum in 5 cc. hexane to 0.84 gram $TiCl_4$ in 100 cc. benzene, with stirring. The mol ratio of aluminum to titanium was 2:1.

Ethylene gas was bubbled through a tube of ethyl vinyl ether and the resulting gaseous mixture of ethylene plus ethyl vinyl ether bubbled into the liquid reaction mixture. There resulted tar-like black solid material in the bottom of the reactor covered with a clear, dark-colored liquor. The latter was decanted, poured into methanol with the formation of no precipitate, and then discarded. The solids remaining from the decantation were covered with methanolic hydrogen chloride (1 cc. concentrated aqueous HCl per 100 cc. methanol), and most of the solids went into solution. The small insoluble portion, after washing in methanol, then acetone, and then drying weighed about 0.1 gram.

The methanolic solution of the polymer was evaporated to dryness on a steam bath leaving dark brown-colored solids. These polyethylene-like solids were partially soluble in cold methanol, slightly soluble in acetone, and almost insoluble in benzene. The weight was about 0.5 to 1.0 gram.

*Example 3*

A solution of 0.84 gram $TiCl_4$ in 100 cc. hexane was placed in the nitrogen-purged glass reactor. Into this, with stirring, was introduced 1.0 gram triethylaluminum in 5 cc. hexane, resulting in an aluminum:titanium mol ratio of 2.0:1.

Ethylene was introduced into the liquid for a period of 15 minutes, resulting in the formation of a flocculent brown precipitate. The flow of ethylene was then stopped, and lamp grade nitrogen was passed through liquid vinyl ethyl ether and then into the reaction mixture. This was contiued for about one hour, during which time about 30 cc. ethyl vinyl ether was thus introduced in the vapor phase. The reaction mixture remained warm during the entire period.

The solids were allowed to settle, and the clear supernatant liquid, brown in color, was poured off and evaporated, giving a residue which was a clear, stiff, flexible solid, brown in color.

The solids undissolved in the reaction mixture were filtered from residual liquid and washed three times in methanol (in which ethyl vinyl ether homopolymer is soluble). After drying, the solids weighed 1.2 grams.

This insoluble material was molded at 140° C. to give a translucent, light yellow test specimen, which was subjected to the Clash-Berg modulus test. This is a measure of the stiffness of a plastic specimen as a function of temperature, measured by means of a torsional test. The test is essentially that described by Clash and Berg, Ind. Eng. Chem. 34, 1218 (1942). The brittle temperature ($T_f$) is the temperature at which the stiffness modulus is 135,000 p.s.i. The rubber temperature ($T_{2000}$) is the temperature at which the stiffness modulus is 2000 p.s.i. The Stifflex range is $T_{2000}$ minus $T_f$, and is a measure of what can be called the transition range of the polymer. Results of the test were:

|  | ° C. |
|---|---|
| $T_f$ | −20 |
| $T_{2000}$ | 114 |
| Stifflex range | 134 |

These values are similar to those obtained with ethylene homopolymer produced under otherwise the same conditions and with the same catalyst. However, the ethylene/ethyl vinyl ether copolymer is somewhat softer, i.e., more flexible or less stiff, particularly at the higher temperatures, its $T_{2000}$ being appreciably lower than the $T_{2000}$ for the ethylene homopolymer. Thus, the copolymer has a broad transition range, which is desirable for many uses, and is somewhat softer than ethylene homopolymer at room temperature and higher. Of course for some end uses, this increased softness alone is not advantageous or is even sometimes a disadvantage, while for other uses it is an advantage. In view of the comparatively large weight percentage ethyl vinyl ether in the copolymer, as shown below by analysis, the stiffness modulus characteristics of the copolymer are excellent, approaching to a large degree those for ethylene homopolymer.

The density of this material was 0.962, as compared with 0.945 for ethylene homopolymer prepared under similar conditions.

The copolymer was analyzed for carbon and hydrogen, the difference between the sum of the carbon and hydrogen percentages and 100 percent being taken as oxygen by difference, with the following results.

| | |
|---|---|
| Carbon, weight percent | 79.5 |
| Hydrogen, weight percent | 14.2 |
| Oxygen, weight percent (difference) | 6.3 |
| | 100.0 |

Since the oxygen content of 100 percent polyethyl vinyl ether is 22.2 weight percent, the ethyl vinyl ether content of the copolymer, based on oxygen content, is 28 percent.

This copolymer is an excellent material for use as an interlayer in glass laminates. It can be molded into a film which is pressed between two sheets of plate glass to make shatter-resistant glass. The comparatively high oxygen content gives considerable adhesiveness towards the glass which is not found in ethylene homopolymer, and the broad transition range makes the composition usable over a wide range of temperatures. While the copolymer can be used alone for this purpose, it is also advantageously blended with other materials known for such use, such as polyvinylbutyral, softeners, tackifiers, adhesives, age-resistors and the like, as may be required for particular applications. This copolymer can also be formed into film, as by extrusion, expanded balloon technique, etc., which accepts print more readily than ordinary polyethylene film and thus is useful as a packaging material.

*Example 4*

Into a nitrogen-purged centrifuge bottle containing 4.0 gram triisobutylaluminum in 40 cc. hexane, there was added dropwise 1.0 gram $TiCl_4$ in 10 cc. hexane, with swirling. After ten minutes, the mixture was centrifuged. The black supernatant liquors were forced off under nitrogen. 50 cc. hexane was then added, the mixture dispersed, and centrifuged. The supernatant liquors, now clear and brown, were forced off. The washing with hexane was repeated again, the liquor then forced off being relatively colorless. Then 40 cc. hexane was added, the material swirled to disperse the solids in hexane, and about one-fourth of this black dispersion forced into the reactor.

In the reactor containing the catalyst was added 7 cc. of vinyl 2-ethylhexyl ether. Almost immediately heat evolution was noticed. The reaction was allowed to proceed, with magnetic stirring, for 10 to 15 minutes. The reaction mixture at that time was still warm, about 45° C. Hexane in the amount of 25 cc. was then added and ethylene gas introduced. During the first few minutes of ethylene flow a small amount of ethylene may have been taken up, but within 10 to 15 minutes the reaction mixture was cold, with no ethylene uptake occurring. The reaction mixture was a viscous, dark-brown, smooth liquor containing no visible lumps.

The reaction mixture was stirred into 150 cc. acetone. A large mass of brownish sticky polymer precipitated. The liquors were poured off and the polymer dissolved in about 20 cc. benzene. The benzene solution was then precipitated in methanol, the liquors decanted, and the polymer mass extracted with isobutanol, then methanol again. The methanol was evaporated off leaving in the vessel a golden yellow, very soft sticky polyvinyl 2-ethylhexyl ether. This material did not retain a given form, but gradually flowed to assume the shape of the container. On touching with the finger and then withdrawing the finger, strings of polymer were pulled out from the surface. This polymer could be used alone as an adhesive. It acts as an excellent tackifier when added to rubber cement, i.e., a solution of natural or synthetic rubber in benzene which is used as an adhesive.

*Example 5*

The reactor used in this example was similar to that described above, but was provided with a mechanical stirrer in the form of a rotating rod extending from the top of the reactor down into the bottom and carrying vanes on the lower part of the rod, and an ethylene introduction tube permitting bubbling of ethylene into the reaction mixture near the lower part of the stirring rod.

An estimated 1-gram aliquot of a washed triisobutylaluminum/titanium tetrachloride catalyst prepared in the manner described in Example 4 above, in 35 cc. hexane was charged to the nitrogen-purged reactor.

Ethylene was introduced slowly for an initial period of 25 minutes. The rate of ethylene takeup was slow, indicating that for some reason the catalyst was of limited activity. The temperature rose to 35° C. After the initial ethylene inlet period, 5 cc. of vinyl 2-ethylhexyl ether was added dropwise over a period of 5 minutes, the ethylene gas flow not being interrupted. Thereafter, ethylene flow was continued for another 20 minutes by which time gas uptake had ceased and the reaction mixture was at room temperature.

The reaction mixture was stirred into 175 cc. acetone. A soft, gray solid polymer precipitated out. This was washed in acetone, then in 1 percent methanolic HCl, then in isobutyl alcohol, and finally again in methanol. The polymer was dried and then weighed (0.9 gram). This polymer was partially swollen by, but not dissolved by, benzene. It was a soft, somewhat tacky solid, again adhesive in nature but having greater inherent strength than the polymer of Example 4.

The polymer was subjected to analysis for carbon and hydrogen with the following results.

| | |
|---|---|
| Carbon, weight percent | 81.0 |
| Hydrogen, weight percent | 13.3 |
| Oxygen, weight percent (by difference) | 5.7 |
| | 100.0 |

Since 100 percent vinyl 2-ethylhexyl ether contains 10.2 weight percent oxygen, the analysis of this polymer indicates that its content of vinyl 2-ethylhexyl ether is 56 weight percent, the balance being ethylene.

*Example 6*

Into the reactor described in Example 5 was introduced 2.0 grams triisobutylalumum with 10 cc. benzene. To this was added, with stirring, 0.5 gram $TiCl_4$ in 20 cc. hexane. After one-half hour, 20 cc. more hexane was added, then ethylene gas introduced for a period of 20 minutes. The flow of ethylene gas was then stopped, and 3 grams of 2-ethylhexyl vinyl ether in 8 cc. hexane added dropwise. Stirring was continued for one and one-quarter hours at which time the reaction mixture was at room temperature. Heat had been evolved during ethylene introduction and continued for a time thereafter.

The reaction mixture was precipitated in 400 cc. acetone containing 7 cc. concentrated aqueous HCl. The brown, clear supernatant liquors were poured off and evaporated on a steam bath; a negligible trace of material remained unevaporated.

The solids remaining from the acetone decantation were washed with 150 cc. acetone, then 100 cc. isobutyl alcohol, and finally 100 cc. methanol. The solids were recovered and dried, and weighed 2.1 grams. This ethylene/2-ethylhexyl vinyl ether block copolymer was soft and tacky, and useful as an adhesive.

While the invention has been described herein with particular reference to preferred embodiments thereof, it will be appreciated that variations from the details given herein can be effected without departing from the invention in its broadest aspects.

I claim:
1. A process which comprises first bringing ethylene into contact, at a temperature within the range of −40° C. to 100° C., with a catalyst prepared by the interaction of (*a*) an aluminum compound of the general formula $R_2AlX$ wherein R is an alkyl, cycloalkyl, or aryl radical and X is hydrogen, halogen, or an alkyl, cycloalkyl, or aryl radical with (*b*) a metal halide selected from the group consisting of the chlorides, bromides and iodides of titanium and zirconium, the mole ratio of (*a*) to (*b*) being within the range of 0.3:1 to 15:1, thereby forming a mixture containing ethylene polymer and said catalyst, immediately thereafter contacting an alkyl vinyl ether with said mixture, at a temperature within the range of −40° C. to 100° C., thereby resulting in the formation of an ethylene-based ethylene/alkyl vinyl ether polymer.

2. A process according to claim 1 wherein said catalyst is prepared by the interaction of a trialkylaluminum with titanium tetrachloride.

3. A process which comprises contacting a vinyl ether, at a temperature within the range of −40° C. to 100° C., with a catalyst prepared by the interaction of a trialkylaluminum with titanium tetrachloride, the mole ratio of trialkylaluminum to titanium tetrachloride being within the range of 0.3:1 to 15:1, to produce a polymer of said vinyl ether.

References Cited in the file of this patent

UNITED STATES PATENTS

| | | |
|---|---|---|
| 2,467,234 | Sargent et al. | Apr. 12, 1949 |
| 2,542,771 | Hanford et al. | Feb. 20, 1951 |
| 2,606,179 | Boyd | Aug. 5, 1952 |
| 2,666,758 | Johnson | Jan. 19, 1954 |
| 2,683,140 | Howard | July 6, 1954 |
| 2,721,189 | Anderson et al. | Oct. 18, 1955 |

FOREIGN PATENTS

| | | |
|---|---|---|
| 534,792 | Belgium | Jan. 31, 1955 |

UNITED STATES PATENT OFFICE
CERTIFICATE OF CORRECTION

Patent No. 3,026,290            March 20, 1962

Earl W. Gluesenkamp

It is hereby certified that error appears in the above numbered patent requiring correction and that the said Letters Patent should read as corrected below.

Column 6, line 72, after "90" insert -- weight --; column 12, line 20, for "polymer" read -- copolymer --.

Signed and sealed this 7th day of August 1962.

(SEAL)
Attest:

ERNEST W. SWIDER
Attesting Officer

DAVID L. LADD
Commissioner of Patents